US012781903B2

(12) United States Patent
Dasbach et al.

(10) Patent No.: US 12,781,903 B2
(45) Date of Patent: Nov. 3, 2026

(54) FORCE GENERATOR FOR GENERATING A LINEAR COMPRESSIVE FORCE

(71) Applicant: Viega Technology GmbH & Co. KG, Attendorn (DE)

(72) Inventors: Philipp Dasbach, Wilnsdorf (DE); David Goska, Attendorn (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 393 days.

(21) Appl. No.: 18/389,268

(22) Filed: Nov. 14, 2023

(65) Prior Publication Data

US 2024/0159343 A1 May 16, 2024

(30) Foreign Application Priority Data

Nov. 15, 2022 (DE) ..................... 10 2022 130 171.0

(51) Int. Cl.

| | |
|---|---|
| ***B25B 27/00*** | (2006.01) |
| ***F16B 1/04*** | (2006.01) |
| ***F16L 41/08*** | (2006.01) |
| *F16L 17/06* | (2006.01) |
| *F16L 17/10* | (2006.01) |

(52) U.S. Cl.

CPC .............. *F16L 41/088* (2013.01); *F16B 1/04* (2013.01); *F16B 2200/50* (2018.08); *F16L 17/06* (2013.01); *F16L 17/10* (2013.01)

(58) Field of Classification Search

CPC ..... B25B 27/00; B25B 27/005; B25B 27/023; F16L 41/088; F16B 1/04

See application file for complete search history.

(56) References Cited

U.S. PATENT DOCUMENTS

| | | | | |
|---|---|---|---|---|
| 5,860,203 A * | 1/1999 | Gehr, Jr. | B25B 27/026 29/257 |
| 6,431,536 B1 * | 8/2002 | Maffeis | B23B 31/16279 269/215 |
| 7,010,840 B2 * | 3/2006 | Reale | B25B 27/062 29/263 |
| 8,826,505 B2 * | 9/2014 | Dines | B25J 15/00 29/244 |
| 10,697,572 B2 | 6/2020 | Rosenthal | |
| 2022/0126421 A1 | 4/2022 | Graulich | |

(Continued)

FOREIGN PATENT DOCUMENTS

| | | |
|---|---|---|
| DE | 3228498 A1 | 4/1983 |
| DE | 102011115955 A1 | 5/2012 |
| DE | 102013101109 A1 | 8/2014 |

(Continued)

*Primary Examiner* — Lee D Wilson
(74) *Attorney, Agent, or Firm* — The Webb Law Firm

(57) ABSTRACT

The invention relates to a force generator for generating a linear pressure force, including a housing, an output wedge displaceably arranged in the housing, and a drive wedge for transmitting an externally exerted pressing force into a linear movement of the output wedge. The output wedge is connected to a first pressure element. The housing is connected to a second pressure element. A force applied to the drive wedge causes displacement of the first pressure element relative to the second pressure element. The force generator solves the technical problem of providing a high pressure force and using the known press jaws for this purpose.

6 Claims, 13 Drawing Sheets

(56) References Cited

U.S. PATENT DOCUMENTS

| | | | | |
|---|---|---|---|---|
| 2024/0159343 | A1 * | 5/2024 | Dasbach ................ | B23D 21/00 |

FOREIGN PATENT DOCUMENTS

| | | | |
|---|---|---|---|
| DE | 102019120427 | A1 | 2/2021 |
| JP | 2010105111 | A | 5/2010 |
| WO | 02096250 | A1 | 12/2002 |
| WO | 2010064591 | A1 | 6/2010 |

* cited by examiner

FORCE GENERATOR FOR GENERATING A LINEAR COMPRESSIVE FORCE

CROSS-REFERENCE TO RELATED APPLICATION

This application claims priority to German Patent Application No. 10 2022 130 171.0 filed Nov. 15, 2022, the disclosure of which is hereby incorporated by reference in its entirety.

BACKGROUND OF THE INVENTION

Field of the Invention

The invention relates to a force generator for generating a linear compressive force.

Description of Related Art

Pressing machines such as those commonly used in sanitary and heating installations provide a defined force over a defined stroke. As a rule, this linear drive is used to drive a press jaw. Here, the translatory movement is translated into a pincer movement via a cam drive of an inlet contour. However, both the direction of force application and the available force do not meet the requirements of every application.

A force transmission without changing the direction of movement of the pressing tool is implemented, for example, in a press force intensifier, also called a press booster. For example, the linear drive of the press force booster is used to directly drive a mandrel of a press-fit socket, as described in DE 10 2013 101 109 A1.

Another application of a high compressive force concerns the machining of wall discs used for water pipes to supply taps or the like between a wall and a front-wall.

Wall discs are used to provide a later connection option for fittings, valves, pipes or similar components. The wall disc is fixed to the existing wall and the inlet of the wall disc is connected to a supply pipe, for example a water pipe. The component to be supplied, such as a fitting, is connected to the outlet, which usually points away from the wall at a right angle, so that the medium to be conducted, for example water, can flow from the supply line into the wall disc and from the wall disc into the component.

During the installation of water connections, wall discs with a long pipe section can also be used as a threaded drain, which is shortened during the installation. The shortening of the pipe section can also be done by tearing off a front part of the pipe section at predetermined breaking points, which requires a large compressive or tensile force with short adjustment travel.

SUMMARY OF THE INVENTION

Therefore, the present invention is based on the technical problem of providing a high pressure force and using the known pressing machine with press jaws for this purpose.

According to the invention, the aforementioned technical problem is solved by a force generator for generating a linear pressure force, comprising a housing, an output wedge displaceably arranged in the housing, and a drive wedge for transmitting an externally applied pressing force into a linear movement of the output wedge relative to the housing, wherein the output wedge is connected to a first pressure element, wherein the housing is connected to a second pressure element, and wherein a force exerted on the drive wedge causes a displacement of the first pressure element relative to the second pressure element.

In particular, it is provided that the drive wedge is movable substantially perpendicular to the sliding direction of the output wedge from an initial position to an end position and that the output wedge and the drive wedge have contact surfaces extending obliquely to the direction of movement of the drive wedge and obliquely to the sliding direction of the drive wedge. By moving the drive wedge into the housing, the output wedge is displaced relatively out of the housing and a relative movement occurs between the output wedge and the housing.

Alternatively or additionally, it can be provided that the drive wedge can be moved essentially perpendicular to the sliding direction of the housing from an initial position to an end position and that the housing and the drive wedge have contact surfaces extending obliquely to the direction of movement of the housing and obliquely to the sliding direction of the drive wedge. In this embodiment, a movement of the drive wedge into the housing displaces the housing relative to the output wedge and also results in a relative movement between the output wedge and the housing.

In this case, an angle $\alpha$ between the sliding direction of the drive wedge and the oblique contact surface can be less than 45°, in particular less than 20°, preferably less than 10°. An angle range of 2.5° to 10° is particularly preferred.

The term linear compressive force refers to the linear direction of the compressive force, whereas the compressive force curve over the pressing process can also be non-linear.

For attaching a pressing tool with known press jaw halves or with an articulated pulling jaw, it is further advantageous that attachment surfaces for press jaw halves are formed on the outside of the housing and on the outside of the drive wedge.

Through the previously described wedge drive, the force exerted by the pressing machine and the press jaw is translated through the formation of the wedge shape and the pincer movement of the articulated jaw is converted into a translatory movement. The translation of the forces is determined by the slope of the inclined plane of the wedge, i.e. by setting a suitable angle $\alpha$.

The force exerted by the press jaw to press the drive wedge into the housing is deflected by 90° in the housing of the tool, which offers advantages in many applications. For example, the above-mentioned tearing off of a threaded section of a tube of a wall disc is thus possible in a simple manner. Likewise, the force generator can be used when inserting a press-fit socket. This is because the tool described enables a high compressive force to be generated over a short stroke.

A further design of the described force generators is that the contact surfaces have at least two sections with different angles between the sliding direction of the drive wedge and the inclined sections. In this way, forces of different magnitudes can be set and achieved within one stroke. Due to variable angles in the course of the contact surfaces, linear pressure forces with different magnitudes are generated in sections.

The drive wedge can have different cross-sections such as rectangular or round, whereby the associated contact surface is essentially flat.

To minimise friction losses, low-friction material combinations can be selected or lubricants can be used when designing the elements. Low-friction materials are, for example, bronze or silicon nitride ceramics. For lubrication, a bonded coating or solid lubricants can be used. Friction can also be minimised, for example, in steel-steel combinations by using a bronze intermediate layer.

Another advantage of the described force generator is that due to the interface of the contact surfaces of the force generator, the press jaw does not have to be applied and actuated until later, so that the compact force generator with wedge drive can be assembled without a pressing machine. The pressing machine is only attached to release the power tool. This separate assembly and disassembly of the individual components enables convenient working.

The press jaw's attachment elements, which are preferably designed as ball heads, make it possible to operate the pressing tool from different angles, i.e. to attach and actuate it. This means that the force can be applied from different angular positions so that the press jaw and the force generator can be swivelled.

The system consisting of the described force generator, a press jaw and a pressing machine uses two translations of the force. Firstly, a first force is provided by the pressing machine, which translates into the pivoting force of the press jaw halves through the inlet contour of the press jaw, also called the cam drive. This swivel force is then translated by the wedge drive of the force generator from the drive wedge to the pressure force of the output wedge required for the application.

Furthermore, springs can be provided so that the drive wedge and the driven wedge are reset to their initial positions after the tool is triggered. Because of the high self-locking of the system due to the static friction of the contact surfaces, it is advantageous if both wedges are reset individually.

BRIEF DESCRIPTION OF THE DRAWINGS

In the following, the invention is explained by means of embodiment examples with reference to the drawing. The drawing shows FIG. 1 a wall disc fixed to a wall, FIG. 2 the wall panel from FIG. 1 with an additional front-wall, FIG. 3 the wall disc from FIG. 2 with a screwed-in tool for shortening the drain of the wall disc, FIG. 4 the wall disc from FIG. 3 with the cut-off section after shortening, FIG. 5 the wall disc from FIG. 4 with shortened drain, FIG. 6 the wall disc from FIG. 5 with a mounted fitting, FIG. 7 enlarged view of the tool for shortening the outlet of the wall disc from FIG. 3, FIG. 8 the tool according to FIG. 7 in a first cross-section with a force generator according to the invention for generating a displacement force for pulling apart the first threaded rod and the second threaded rod, FIG. 9 the force generator according to FIG. 8 in a second cross-section in an initial position, FIG. 10 the force generator according to FIG. 9 in an end position, FIG. 11 the force generator according to FIGS. 8 and 9 in a perspective side view with the pressing tool attached, FIG. 12 a schematic representation of the tool with force generator and attached press jaw half according to FIG. 10 with the acting forces, FIG. 13 a schematic partial view of a further force generator and FIG. 14 a schematic partial view of a further force generator.

DESCRIPTION OF THE INVENTION

In the following description of the various embodiments according to the invention, components and elements with the same function and the same mode of operation are given the same reference signs, even if the components and elements may differ in dimension or shape in the various embodiments.

In the following, FIGS. 1 to 7 are used to explain a wall disc whose outlet is designed as a threaded tube section. The length of the drain is changed by tearing off a front part of the tube section. A large compressive or tensile force with a small adjustment path is required for the tear-off, for which a force generator according to the invention can be used. Such a force generator is shown in FIGS. 8 to 12.

Figure 1:
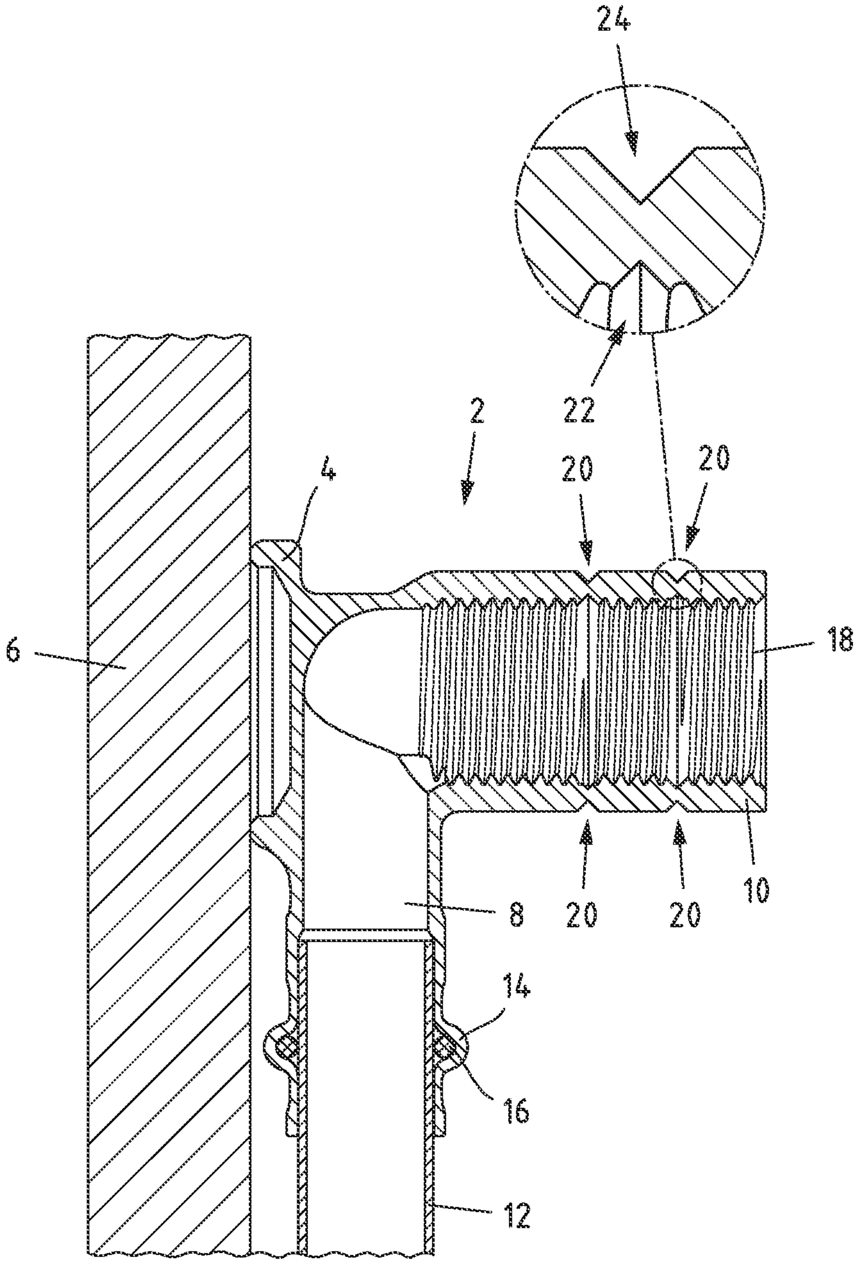

FIG. 1 first shows a wall disc 2 for the connection of a component to be supplied with water. The wall disc 2 has a mounting flange 4 for attachment to a wall 6 and fluidically connects an inlet 8 with an outlet 10 for connection to the component to be supplied. The inlet 8 is connected to a supply line 12 by means of a press fitting 14 and an O-ring 16 and is generally used to conduct water. Of course, any other fluid can also be conducted with the wall disc.

The drain 10 is formed as a pipe section with a thread 18, which is formed as an internal thread and which is used to screw in a threaded section with an external thread of the component to be supplied.

As FIG. 1 shows, the drain 10 has a circumferential recess 20 at two axial positions as a predetermined breaking point. The predetermined breaking points 20 are formed by an inner groove 22 and an outer groove 24.

Figure 2:
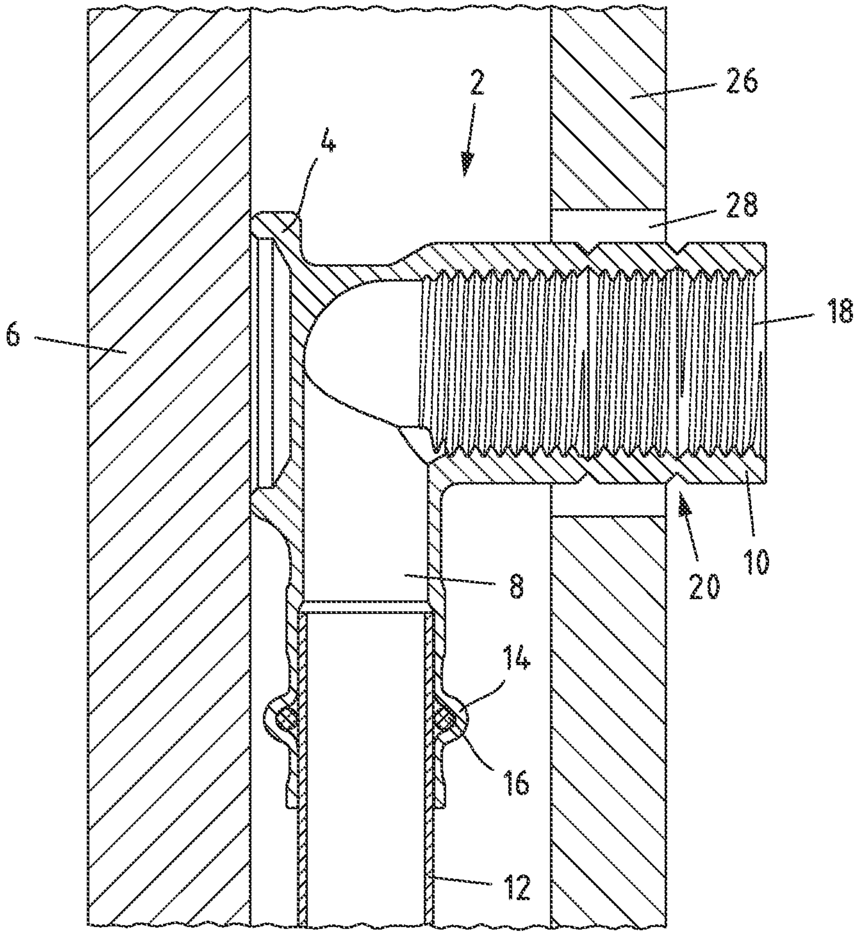

FIG. 2 shows the formation of a front-wall 26 which has been installed at a distance from the wall 6, with the drain 10 protruding through an opening 28.

Figure 3:
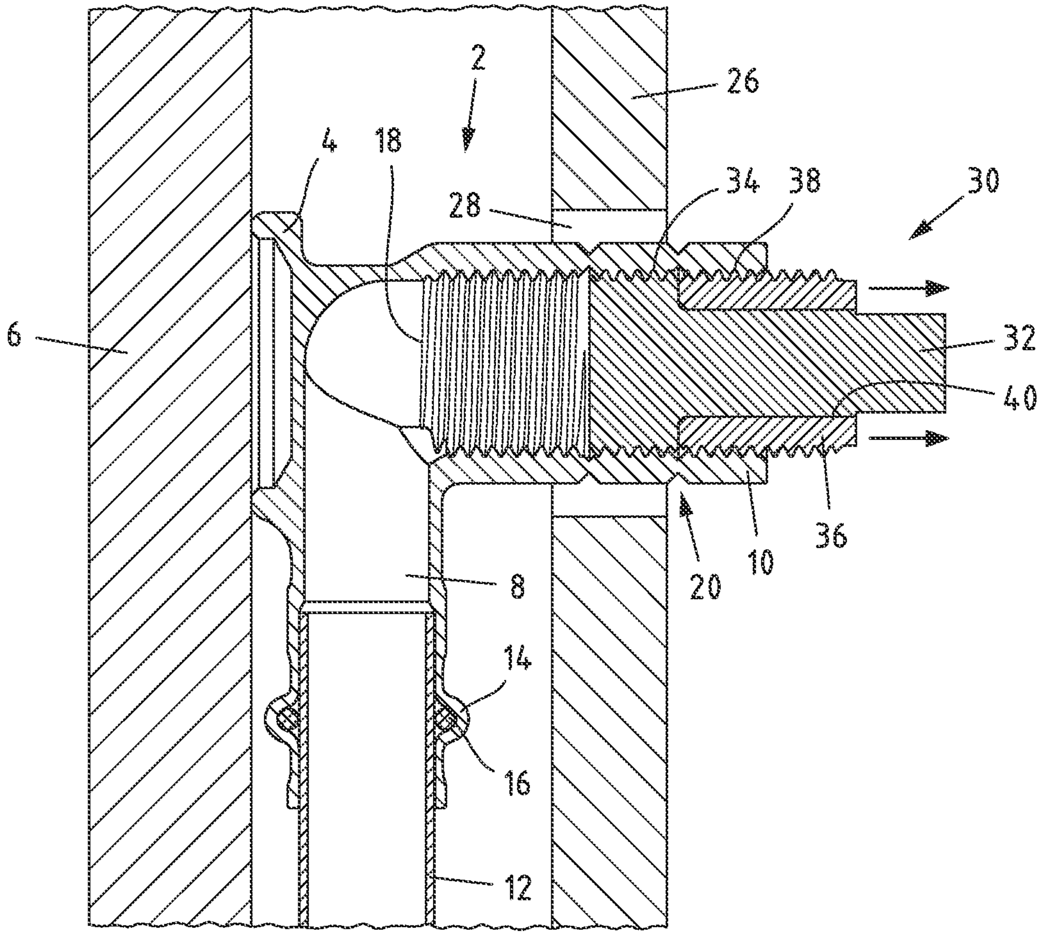

FIG. 3 further shows a tool 30 for shortening the drain 10 of a wall disc 2 according to FIGS. 1 and 2. The tool 30 has a first threaded rod 32 with a first threaded portion 34 and a second threaded rod 36 with a second threaded portion 38. Furthermore, the second threaded rod 36 has a bore 40 for receiving the first threaded rod 32, and the first threaded rod 32 and the second threaded rod 36 are axially displaceable relative to each other.

In a first position of the threaded rods 32 and 36 according to FIG. 3, the first threaded section 34 and the second threaded section 38 are adjacent and aligned with each other so that both threaded sections 34 and 38 can be successively screwed into the same thread 18. In the first position, the two threaded sections 34 and 38 rest against each other.

The threaded rods 32 and 36 are screwed into the thread 18 of the drain 10 to such an extent that the threaded section 34 is proximal to the predetermined breaking point 20 and the threaded section 38 is distal to the predetermined breaking point 20. The point of contact between the two threaded sections 34 and 38 is thus positioned in the area of the predetermined breaking point 20.

Figure 4:
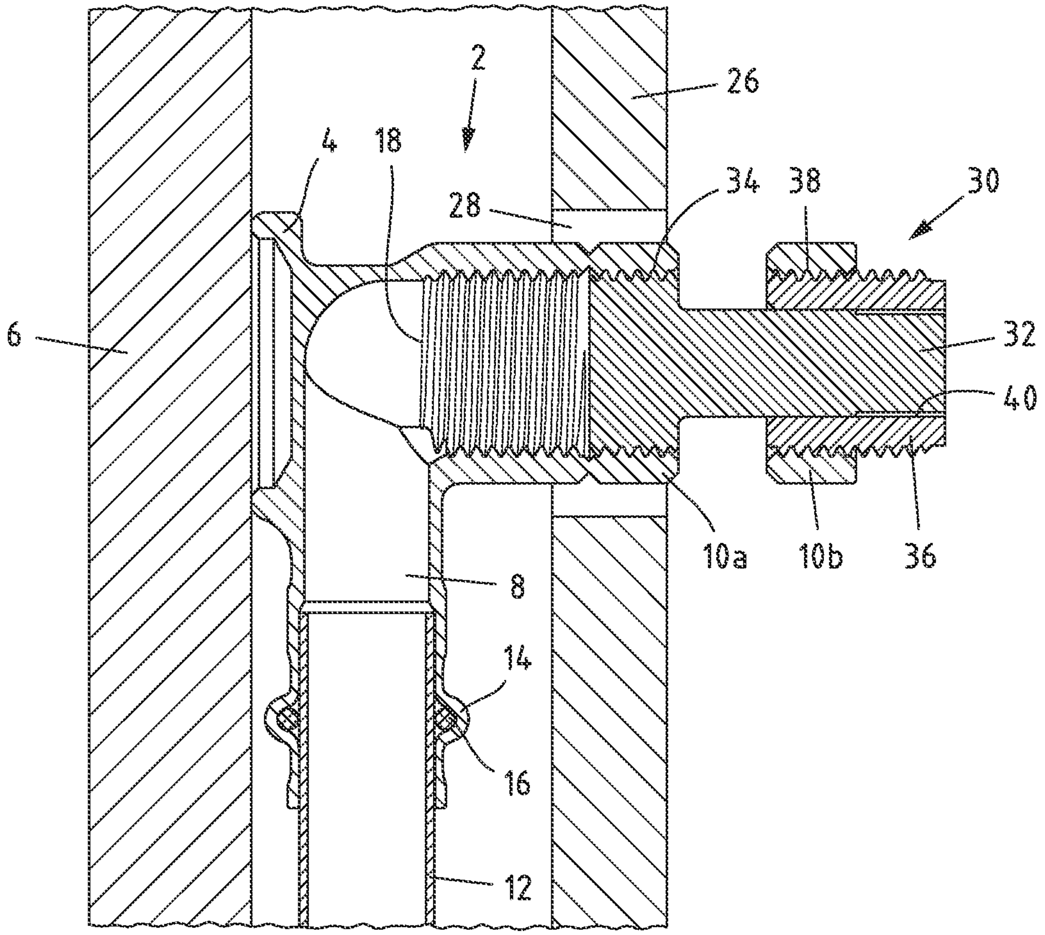

Starting from the first position, the first threaded rod 32 and the second threaded rod 36 are moved apart as indicated by the two arrows. The second threaded rod 36 is pulled out with respect to the first threaded rod 32 and brought into a second position as shown in FIG. 4. By pulling the two threaded rods 32 and 36 apart, the pipe section of the drain 10 is split or torn off at a circumferential predetermined breaking point 20, so that a shortened drain 10*a* is formed and the torn-off part 10*b* can be removed with the second threaded rod 26.

FIG. 4 therefore shows the second position of the threaded rods 32 and 36, in which the first threaded section 34 and the second threaded section 38 are pulled apart and spaced apart.

Figure 5:
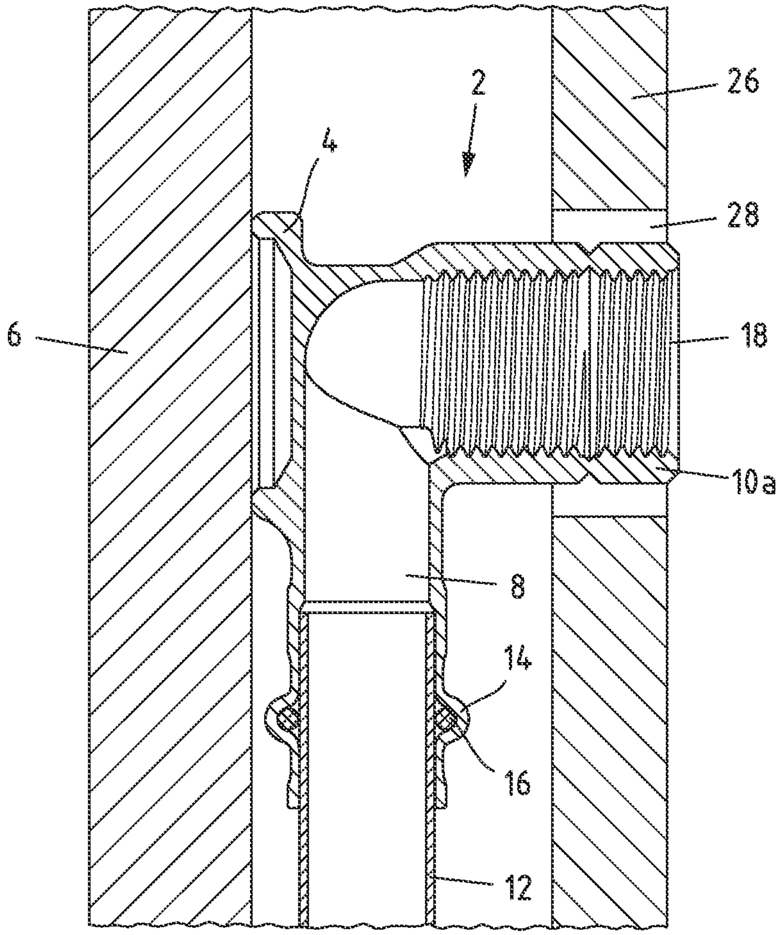

FIG. 5 shows the wall disc 2 after removal of the separated part 10*b* and removal of the tool 30. The front end of the drain 10 protrudes only slightly from the opening 28, so the wall disc 2 has been adapted to the construction depth of the front-wall 26.

Figure 6:
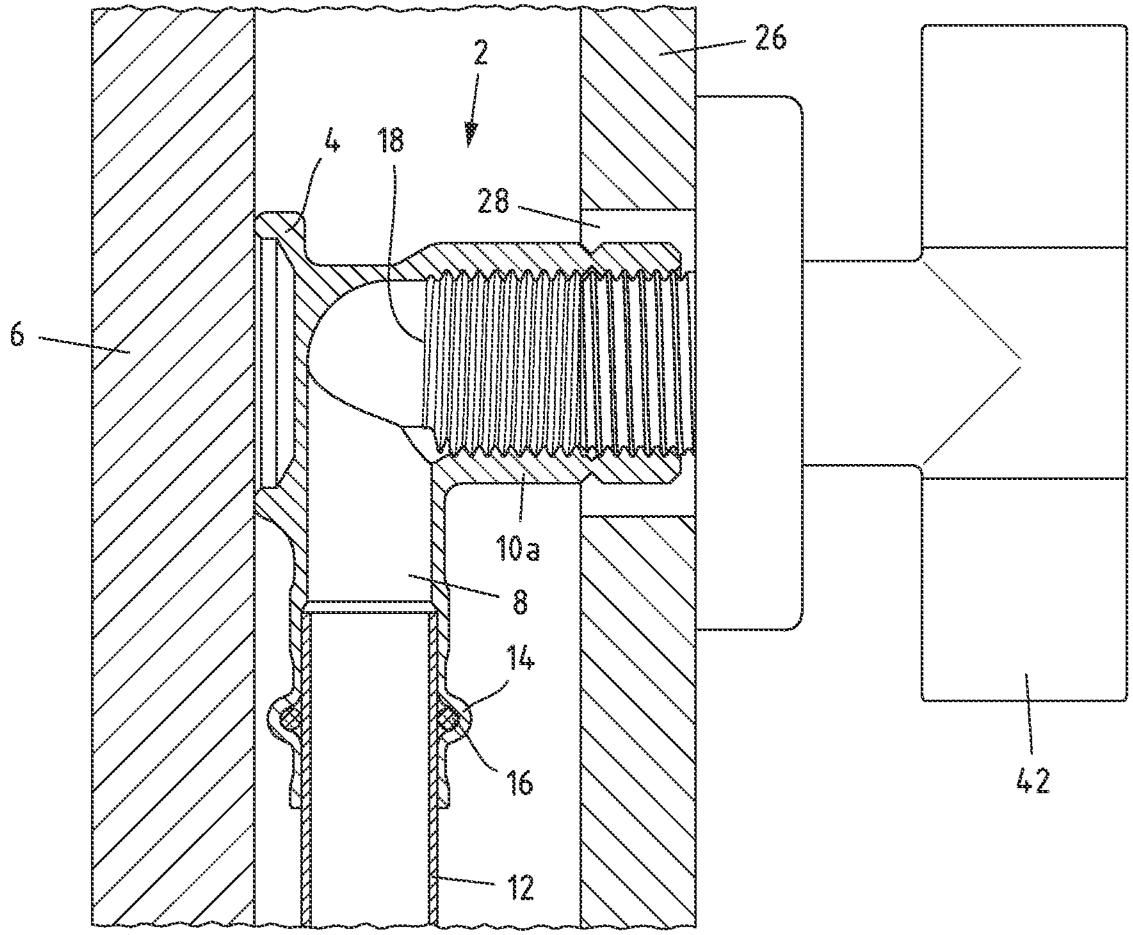

Finally, FIG. 6 shows the fully assembled and adapted wall panel 2 with an attached component in the form of a water tap 42, which is supplied with water starting from the supply line 12 via the inlet 8 and the outlet 10.

Figure 7:
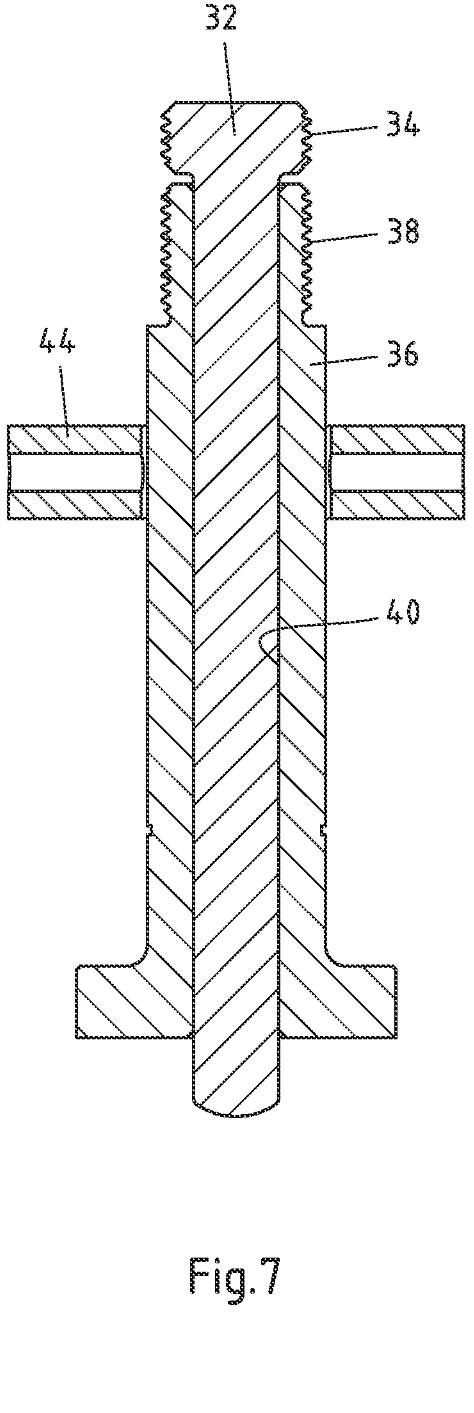

FIG. 7 shows the previously described tool 30 with the first threaded rod 32 and the second threaded rod 36 in cross-section. In addition to the previous illustration, a stop element 44 is provided which is slidably attached to the outside of the second threaded rod 36. By means of a fastening screw (not shown), the stop element 44 can be positioned and fixed. The stop element 44 can be used to specify the depth to which the first threaded rod 32 and the second threaded rod 36 are to be screwed into the thread 18, in order to ensure that one of the predetermined breaking points 20 is ruptured. A further possibility is that the fixing of the stop element 44 is effected via a latching function by means of a resilient thrust piece and a corresponding recess for engaging the thrust piece.

Figure 8:
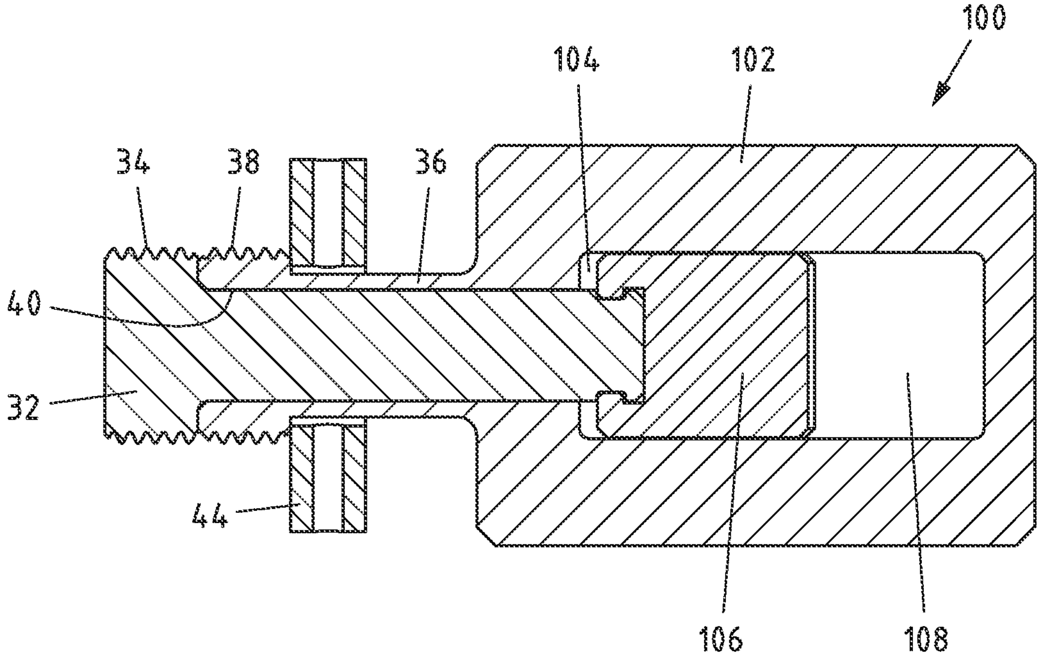
Figure 9:
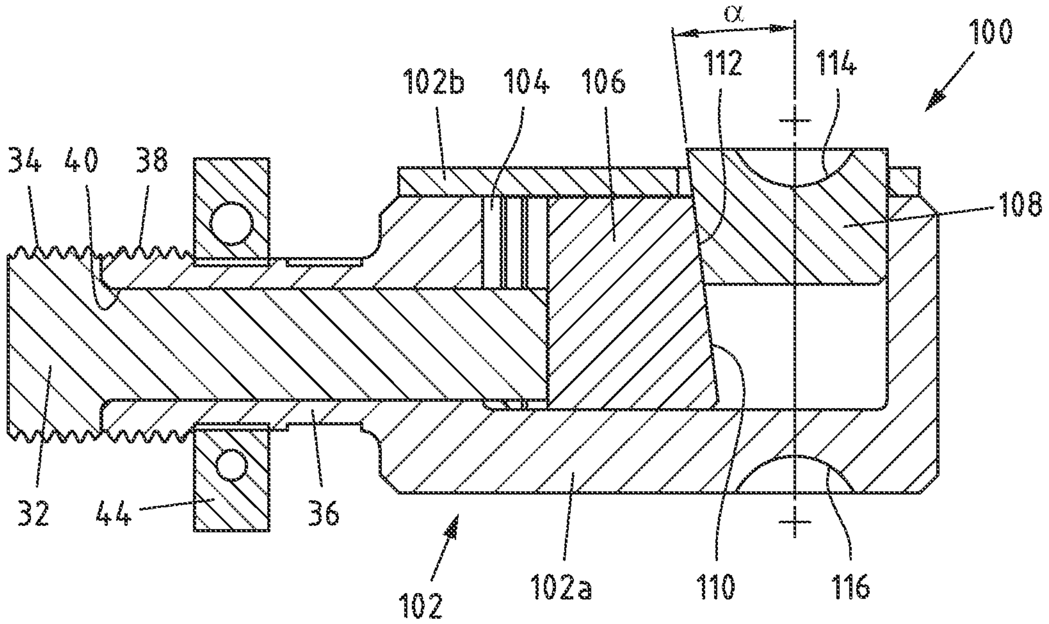
Figure 10:
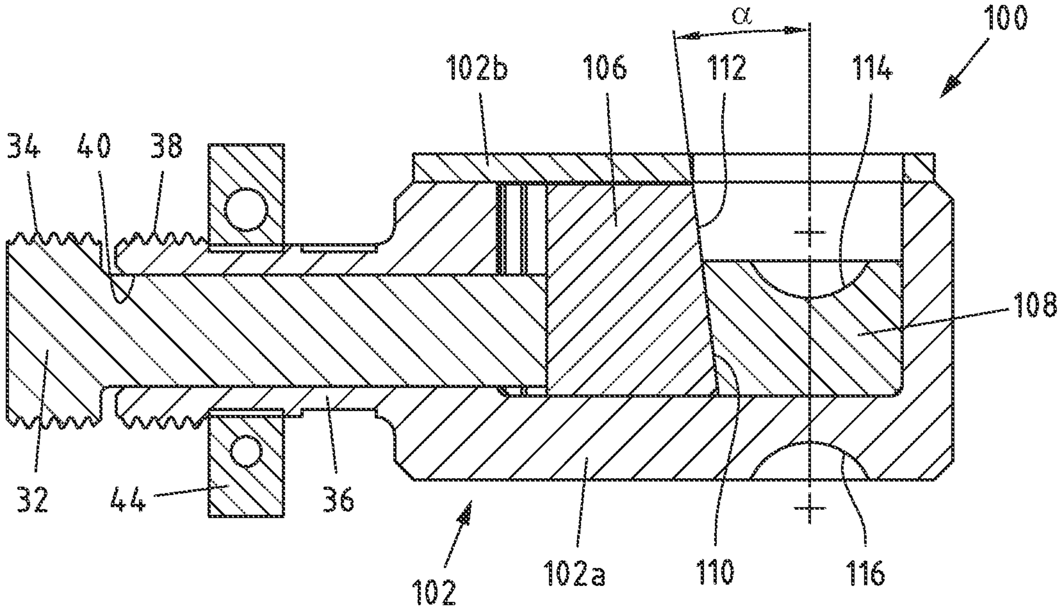

In FIGS. 8 to 10, a tool 30 is shown with the first threaded rod as the first pressure element 32, with the second threaded rod as the second pressure element 36, and with the stop element 44.

Further shown is a force generator 100 according to the invention for generating a linear compressive force, comprising a housing 102, an output wedge 106 slidably arranged in the housing 102, and a drive wedge 108 for transmitting an externally applied compressive force into a linear movement of the output wedge 106 relative to the housing 102, wherein the output wedge is connected to a first pressure element, wherein the housing 102 is connected to a second pressure element 36, and wherein a force applied to the drive wedge 108 causes displacement of the first pressure element 32 relative to the second pressure element 36.

Thus, the force generator 100 generates a displacement force to pull apart the first threaded rod 32 and the second threaded rod 36.

FIG. 8 shows a cross-section in which the drive wedge 106 is moved perpendicular to the drawing plane when the pressing force is applied. FIGS. 9 and 10 show a cross-section in a view perpendicular to the view shown in FIG. 8. Thus, when a pressing force is applied, the drive wedge 106 moves from top to bottom and is thus movable from an initial position (FIG. 9) to an end position (FIG. 10) substantially perpendicular to the sliding direction of the output wedge 106.

For this purpose, the output wedge 106 and the drive wedge 108 have contact surfaces 110 and 112 running obliquely to the direction of movement of the output wedge 106 and obliquely to the sliding direction of the drive wedge 108. In this case, an angle $\alpha$ between the sliding direction of the drive wedge 108 and the obliquely extending contact surface 112 is less than 20°, preferably less than 10°.

The two sides of the drive wedge 108 have round attachment surfaces 114 and 116 for attaching a press jaw (see FIG. 11 below). In addition, the housing 102 consists of a pot-like part 102*a* and a cover 102*b*. In a preferred manner, a biasing spring (not shown) is also provided for returning the drive wedge 108 to the starting position.

The force exerted by the input key 108 on the output key 106 causes the output key 106 to move relative to the housing 102, which in turn causes relative movement between the first threaded rod 32, which is connected to the output key 106, and the second threaded rod 36, which is connected to the housing. In FIG. 10, the two ends of the threaded sections 34 and 38 are shown spaced apart.

In the above described application of the tool 100 with a stationary wall disc 2, the housing 102 together with the second threaded rod 36 is thus removed from the wall disc 2 and the first threaded rod 32 remains stationarily connected to the wall disc 2, as has been described above. The force transmitted by the output wedge 106 thus causes the thread 18 of the drain 10 to break off at the predetermined breaking point 20.

Figure 11:
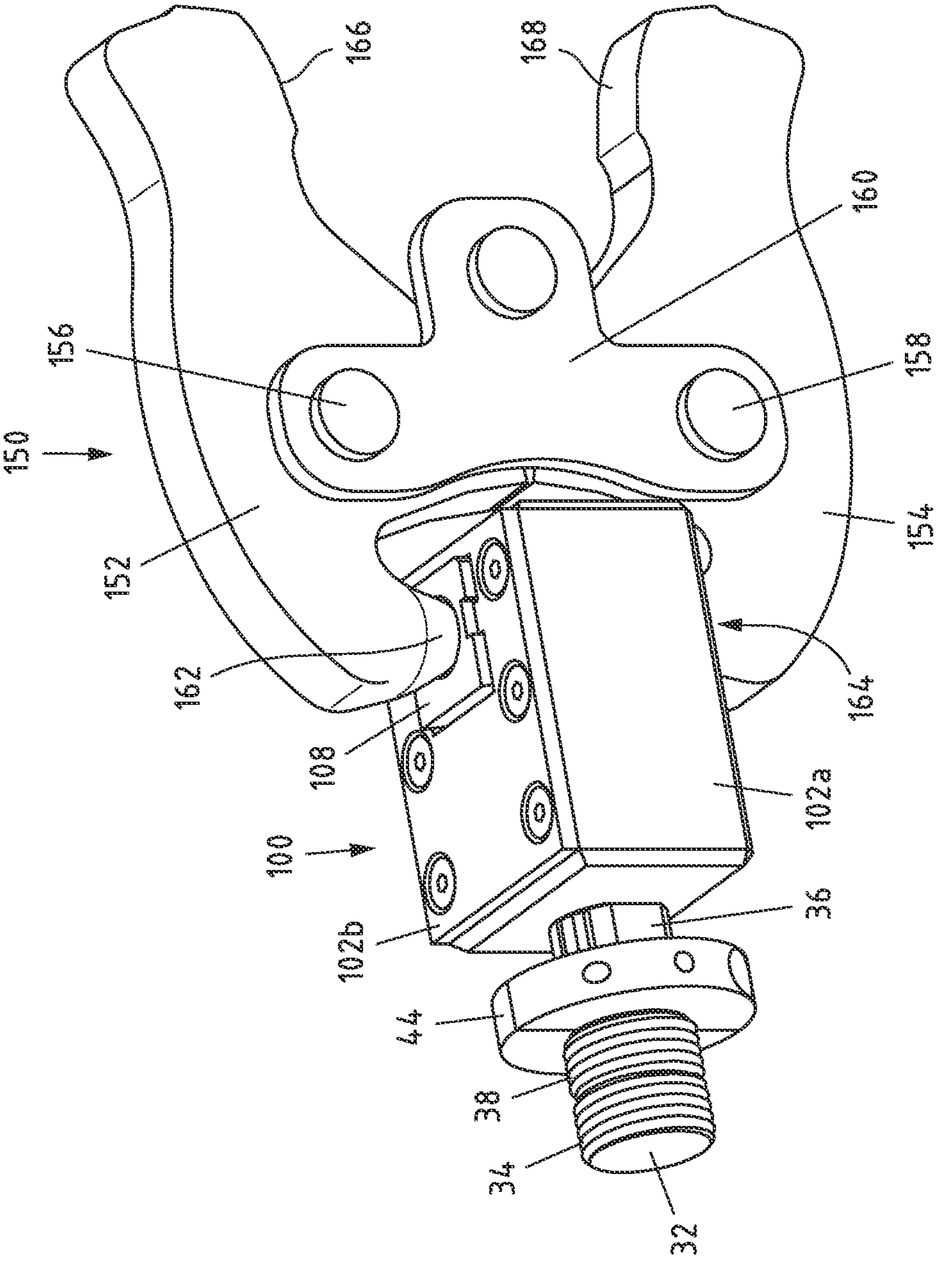

FIG. 11 shows a perspective view of the described force generator 100 with an attached press jaw 150, which has two press jaw halves 152 and 154. The press jaw halves 152 and 154 are attached to a holder 160 by means of joints 156 and 158 and have attachment elements 162 and 164 at the front end. The attachment elements 162 and 164 have a dome-like round shape corresponding to the attachment surfaces 114 and 116 of the drive wedge 108. The round shape allows the press jaw halves 152 and 154 to be attached to the drive wedge 108 at different angles and then actuated.

The press jaw 150 is actuated by a pressing machine, not shown, which is known per se and which can advance a piston hydraulically or by electric motor, in FIG. 11 from right to left. Two rollers are attached to the end of the piston, which roll on the inner sides 166 and 168 of a so-called inlet contour and thus press the press jaw halves 152 and 154 apart when the piston is advanced. The pushing apart results in the pressing together of the attachment elements 162 and 164, whereby the pressing force is exerted on the drive wedge 108.

Figure 12:
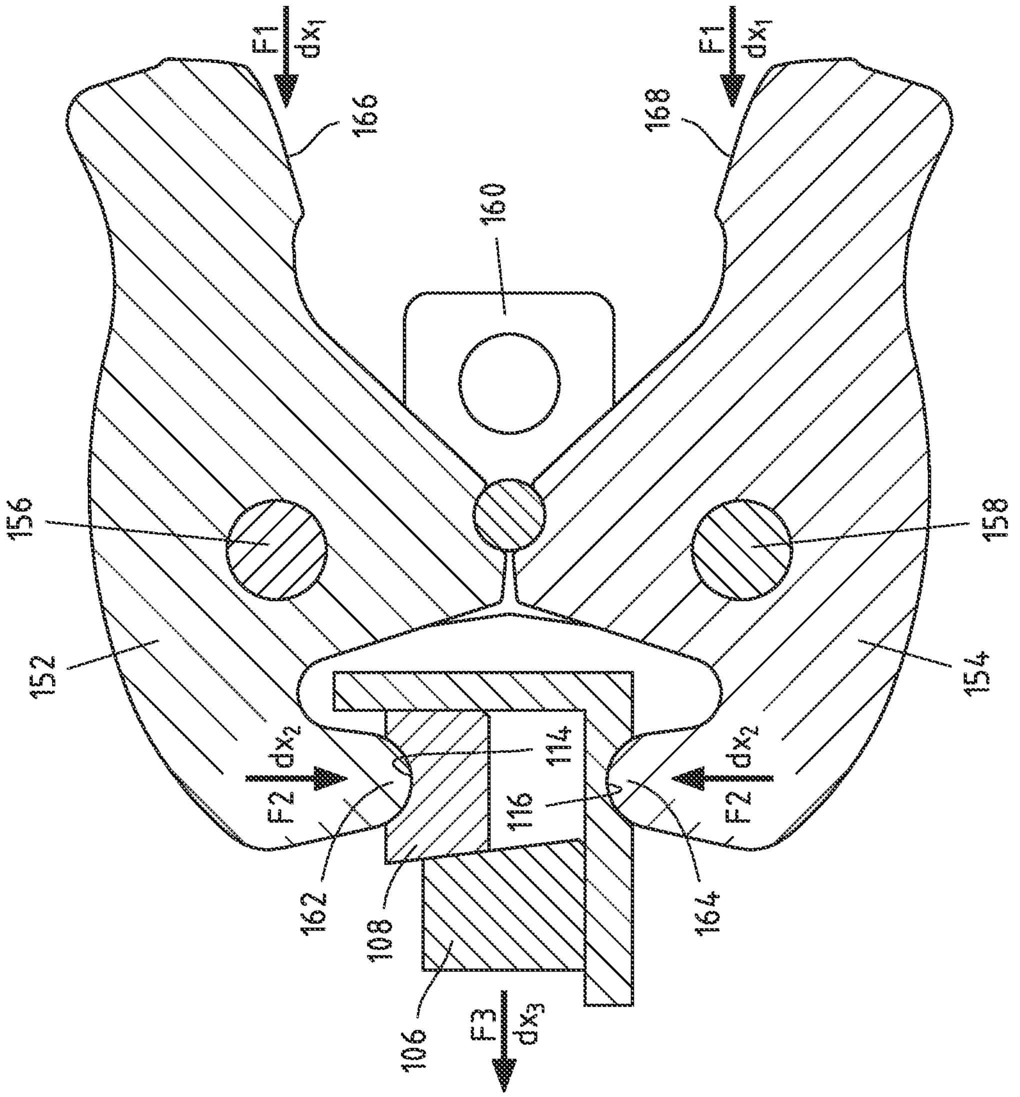

FIG. 12 schematically shows the forces exerted in the arrangement described above. The piston (not shown) moves from right to left by a distance dx1 and exerts a horizontally acting force F1 (see arrows), which leads to a pivoting of the press jaw halves 152 and 154. The pivoting movement generates a force F2, shown vertically with an arrow in FIG. 11, while the attachment element 162 moves by a distance dx2. Here, dx2 is smaller than dx1 and the force F2 is greater than F1.

Through the oblique surfaces 110 and 112, the movement of the drive wedge 108 is transmitted to the output wedge 106, whereby the surfaces 110 and 112 slide over each other. Depending on the predetermined angle $\alpha$, the pressing force exerted on the drive wedge 108 is transmitted to the output wedge 106 as force F3, so that F3 is greater than F2. In addition, the magnitude of the displacement dx3 of the output wedge 106 is smaller than the magnitude of the displacement dx2 of the drive wedge 108.

The described force generator 100 thus enables a force transmission by the drive wedge 108 starting from a smaller force, which is transmitted to the drive wedge 108 over a larger adjustment path of a press jaw, into a smaller sliding movement with a larger sliding force.

This force transmission is particularly advantageous for the described cutting off of a part of a pipe section, as a large force is required with only a short adjustment path.

The arrows shown in FIG. 12 are not to scale, but merely indicate the direction of movement and force application.

Depending on the dimensioning of the individual components, a transmission ratio for F1:F3 of 1:2 to 1:30 or more can be achieved.

Figure 13:
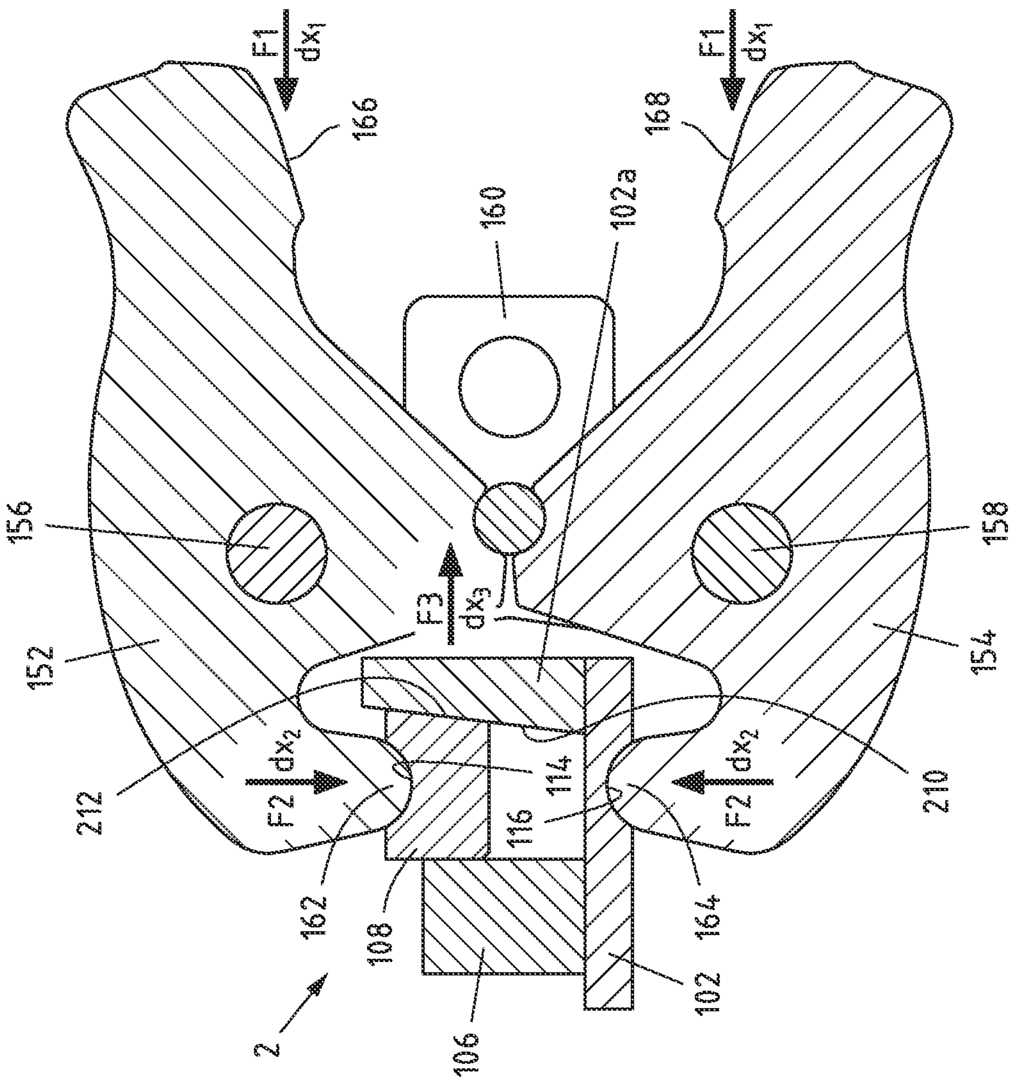

FIG. 13 shows a schematic partial view of a further embodiment example of a force generator 2, in which the drive wedge 108—as previously described—is movable substantially perpendicular to the sliding direction of the housing 102 from an initial position to an end position. In contrast to the previous embodiment example, the housing 102 with the housing section 102*a* and the drive wedge 108 have contact surfaces 210 and 212 extending obliquely to the direction of movement of the housing 102 and obliquely to the sliding direction of the drive wedge 108.

Thus, the force F2, which causes the drive wedge 108 to move downwards in FIG. 13, is converted into a horizontal force F3—acting to the right in FIG. 13—and the housing section 102*a* is displaced to the right in FIG. 13. The output wedge 106 is not displaced relative to the drive wedge 108 and relative to the lower part of the housing 102.

Figure 14:
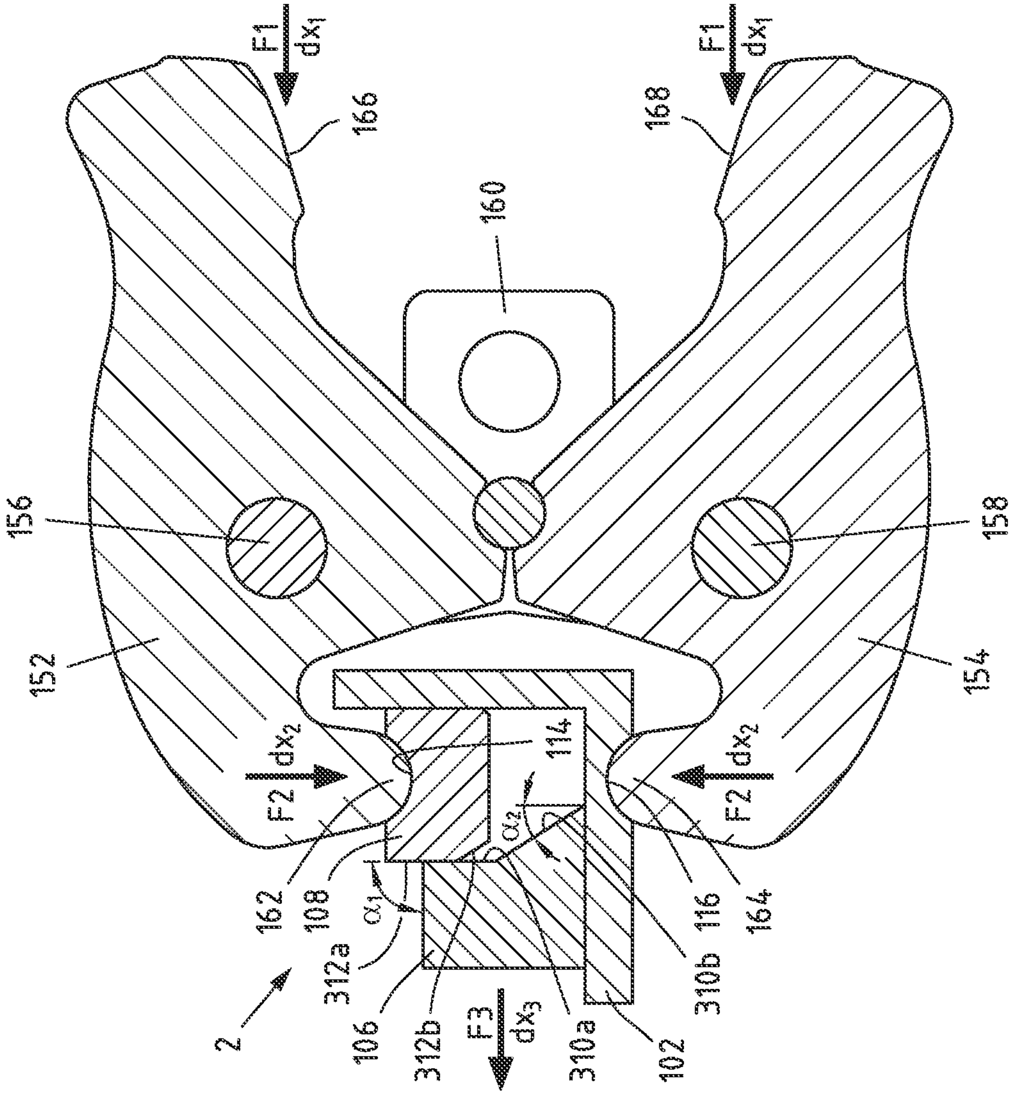

In FIG. 14, a further embodiment of the force generator 2 is shown in which the contact surfaces 310 and 312 have at least two sections 310 with different angles $\alpha_1$ and $\alpha_2$ between the sliding direction of the drive wedge 108 and the inclined sections 310*a*, 312*a* and 312*a*, 312*b*.

In the illustrated embodiment example, the angle $\alpha_1$ is formed smaller than the angle $\alpha_2$ and is less than 20°, while the angle $\alpha_2$ is correspondingly larger and preferably lies in a range between 20° and 45°. However, the angle $\alpha_1$ can also be selected larger than the angle $\alpha_{.2}$.

The invention claimed is:

1. A force generator for generating a linear compressive force, with a housing, with an output wedge displaceably arranged in the housing and with a drive wedge for transmitting an externally applied pressing force into a linear movement of the output wedge relative to the housing, wherein the output wedge is connected to a first pressure element, wherein the housing is connected to a second pressure element, and wherein a force applied to the drive wedge causes displacement of the first pressure element relative to the second pressure element.

2. The force generator according to claim 1, wherein the drive wedge is movable substantially perpendicular to a sliding direction of the output wedge from an initial position to an end position, and the output wedge and the drive wedge have contact surfaces extending obliquely to a direction of movement of the drive wedge and obliquely to a sliding direction of the drive wedge.

3. The force generator according to claim 1, wherein the drive wedge is movable substantially perpendicular to a sliding direction of the housing from an initial position to an end position, and the housing and the drive wedge have contact surfaces extending obliquely to the sliding direction of the housing and obliquely to a direction of sliding of the drive wedge.

4. The force generator according to claim 2, wherein an angle between the sliding direction of the drive wedge and the obliquely extending contact surfaces is less than 45°, in particular less than 20°, preferably less than 10°.

5. The force generator according to claim 2, wherein the contact surfaces have at least two sections with different angles between the sliding direction of the drive wedge and the obliquely extending contact surfaces.

6. The force generator according to claim 1, wherein attachment surfaces for press jaw halves are formed on an outside of the housing and on an outside of the drive wedge.

* * * * *